June 12, 1956  W. A. SHURCLIFF  2,750,515
RADIATION DETECTION DEVICES

Filed Feb. 12, 1952  2 Sheets-Sheet 1

INVENTOR
William A. Shurcliff
BY Brown and Mikulka
ATTORNEYS

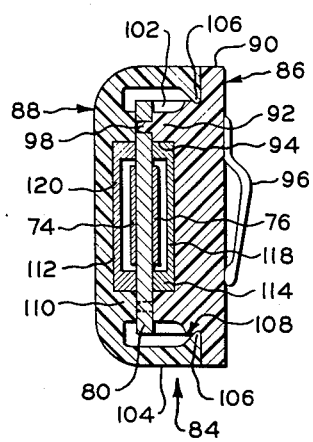
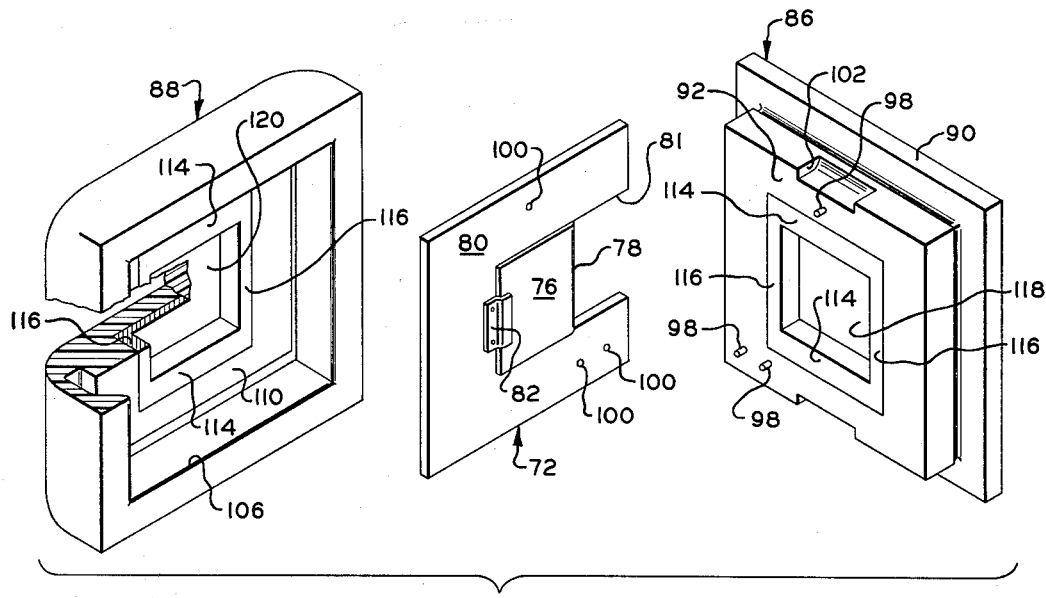
FIG. 4 ced # United States Patent Office 2,750,515
Patented June 12, 1956

2,750,515

RADIATION DETECTION DEVICES

William A. Shurcliff, Cambridge, Mass., assignor to Polaroid Corporation, Cambridge, Mass., a corporation of Delaware Application February 12, 1952, Serial No. 271,264

14 Claims. (Cl. 250—83)

This invention relates to detection and more particularly to means, commonly known as dosimeters, for detecting and measuring penetrative radiation of the kind emanating from radioactive or fissionable materials.

Certain materials are known to change in predetermined properties when subjected to penetrative radiation, i. e., gamma radiation, of the kind emanating from radioactive or fissionable materials. It is apparent that such a material or combination of materials may be fashioned into a detecting element which, when affixed to a wearer, will give a rough indication of the dose of radiation to which the wearer has been subjected, the dose ordinarily being measured in roentgens.

A detecting element of the aforementioned type will indicate the quantity of penetrative radiation to which it has been subjected and, when mounted adjacent a region of a wearer's body, will indicate approximately the quantity of penetrative radiation to which that region has been subjected. In determining the harmful effects of penetrative radiation on the wearer's body as a whole, however, the quantities of penetrative radiation received by the various regions of the wearer's body must be taken into consideration. By way of example, the average of the doses of penetrative radiation received by various regions of the wearer's body is of accurate medical significance.

It has been found that there may be a tremendous difference between the dose recorded by a detecting element of the aforementioned type and the average of the doses received by the various regions of the wearer's body. Consider, for example, a person who has worn such a detecting element on his chest in the presence of an atomic explosion. The average dose of gamma radiation from the explosion received by the wearer, and the attendant harmful effects associated with this average, will be of the same order of magnitude whether the wearer has faced toward or away from the explosion. Yet, the detecting element on his chest will indicate a smaller than average dose when the wearer has faced away from the explosion and a larger than average dose when the wearer has faced toward the explosion. The smaller dose is indicated by reason of the shielding effect of the wearer's body, the larger dose by reason of a complete absence of shielding. Similar discrepancies between the dose indicated by a detecting element of the above type and the average dose received by the wearer's body exist when radiation strikes the wearer's body from the side, from overhead, or from underfoot.

Accordingly, it is an object of the present invention to provide a dosimeter that is adapted to measure the effective dose of radiation received by a wearer thereof rather than merely the approximate dose of radiation received by that region of the wearer's body adjacent which the dosimeter is supported.

Other objects of the invention are to provide a dosimeter which comprises at least a pair of detecting elements, each of which is composed of a substance that appreciably changes in predetermined properties when subjected to a quantity of penetrative radiation, the degree of change being functionally related to the quantity of penetrative radiation, and a radiation-attenuating shield separating the elements; to provide a dosimeter of the above type, the detecting elements of which may be predeterminedly oriented with respect to a wearer; to provide a dosimeter of the above type in which the detecting elements are mounted in a casing in such a manner that they may be easily examined; to provide a detecting element with a shield which attenuates radiation in such a manner as to produce in the detecting element a dose which corresponds to the effective dose received by a wearer; and to provide a dosimeter of the above type which is economical in construction and simple in operation.

Other objects of the invention will in part be obvious and will in part appear hereinafter.

The invention accordingly comprises the product possessing the features, properties and the relation of components which are exemplified in the following detailed disclosure and the scope of the application of which will be indicated in the claims.

For a fuller understanding of the nature and objects of the invention, reference should be had to the following detailed description taken in connection with the accompanying drawings wherein:

Fig. 3 is a cross-sectional view of an alternative dosimeter embodying the present invention with the components thereof operatively assembled; and Fig. 4 is an exploded perspective view of the dosimeter of Fig. 3.

A dosimeter embodying the invention herein disclosed comprises essentially at least two detecting elements each of which is composed of a material that appreciably changes in predetermined properties when subjected to a quantity of penetrative radiation, the degree of change being functionally related to the quantity of penetrative radiation. The two detecting elements are separated from each other by a radiation-attenuating shield so as to be differentially exposed to radiation incident thereupon and so as to indicate thereby the direction from which the radiation has emanated. Such an indication enables calculation both of the shielding effect of one region of the wearer's body on the other regions thereof and of what may be termed the effective dose of radiation received by the wearer's body. The calculation of the effective dose may involve merely determination of an average of the doses received by the various regions of the wearer's body or may give weight to the doses received by critical regions so as to provide a measure which, from a precise medical standpoint, indicates the injury which the wearer's body has suffered.

Figure 1:
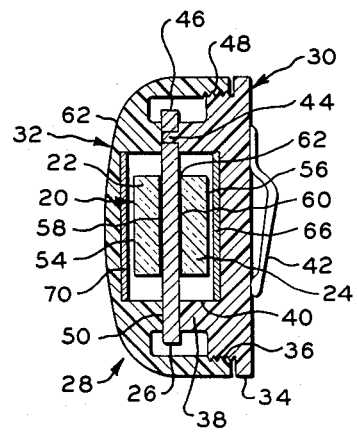
Figure 1 is a cross-sectional view of a dosimeter embodying the present invention with the components thereof operatively assembled.
Figure 2:
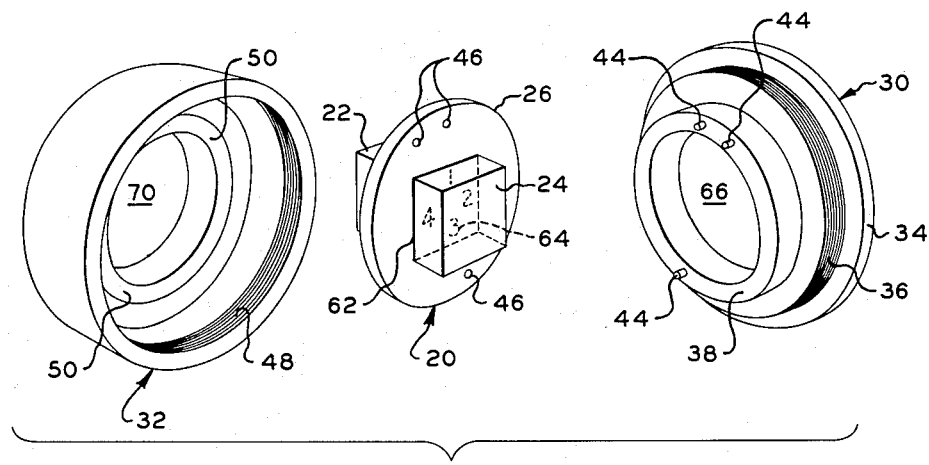
Fig. 2 is an exploded perspective view of the dosimeter of Fig. 1.

Referring now to the drawings, wherein like numerals denote like parts, Figs. 1 and 2 illustrate a dosimeter, which, in accordance with the present invention, comprises a detecting means, generally shown at 20, for measuring the effective dose of penetrative radiation to which the body of a wearer thereof has been subjected. In the form shown, detecting means 20 includes a pair of detecting elements 22 and 24, each of which is composed of a material that appreciably changes in a predetermined manner when subjected to a quantity of penetrative radiation, the degree of change being functionally related to the quantity of penetrative radiation. In the illustrated embodiment, detecting elements 22 and 24 are mounted on opposite surfaces of a shield 26 which is composed of a material that is adapted to effectively attenuate penetrative radiation passing therethrough. Preferably, shield 26 is composed of a heavy material, such, for example, as one of cadmium, lead and uranium, having a density (mass per unit volume) and an atomic number at least as great, respectively, as the density and atomic number of cadmium. By reason of the attenuating effect of shield 26, penetrative radiation directed toward detecting means 20 may produce a different degree of change in detecting element 22 than in detecting element 24. It is apparent therefore that if detecting means 20 were predeterminedly oriented on a wearer's chest during an atomic explosion, by comparing detecting elements 22 and 24 thereafter, the intensity and direction of incident penetrative radiation may be calculated. Thus, if detecting means 20 is mounted on a wearer so that element 24 is interposed between element 22 and the wearer's chest, radiation emanating from in front of the wearer would produce a greater change in element 22 than in element 24, radiation emanating from the rear of the wearer would produce a greater change in element 22 than in element 24, and radiation emanating from above, below or either side of the wearer would produce substantially equal changes in elements 22 and 24.

In the illustrated embodiment, detecting elements 22 and 24 take the form of a pair of silver phosphate glass parallelepipeds. It has been found that after silver phosphate glass has received a dose of gamma radiation, it has the property of emitting orange fluorescent light upon being subjected to near ultraviolet radiation. The intensity of such fluorescent light is substantially proportional to the dose of gamma radiation and may be measured by a suitable photoelectric tube circuit. It further has been found that the portion of a phosphate glass element closest to the source of radiation to which the element has been subjected, when the element is excited with ultraviolet radiation, produces more intense fluorescence than do other portions of the element. Thus, by exciting elements 22 and 24 with ultraviolet radiation and comparing the intensities of fluorescent light emanating from the various surfaces thereof, the direction of incidence of radiation emanating from above, below or either side of the wearer and the intensity of that radiation may be calculated. Such means as charts, tables, electronic circuits, etc. may be used for this purpose.

As a means for mounting and enclosing the components of the illustrated dosimeter, a casing 28, which includes a mounting means or base 30 and a closure means or cover 32, is provided. Base 30 and cover 32 are composed of any suitable material, one example of which is one of the many organic plastics that do not appreciably attenuate gamma radiation.

As shown, base 30 includes a head portion 34, a peripherally threaded shank portion 36 integral therewith, and an annular portion 38 integral with shank portion 36. Annular portion 38 is cut out, as at 40, in order to receive therewithin a portion of detecting means 20. Such means as a clip 42 is provided for fastening base 30 to the chest of a wearer.

In accordance with the present invention, means are provided for predeterminedly orienting detecting means 20 with respect to base 30. In the form shown, this means comprises three irregularly spaced pins 44 which are integral with or otherwise secured to annular portion 38 and which are adapted to project into three similarly spaced apertures 46 in shield 26. Pins 44 are adapted to project into apertures 46 and to properly seat detecting means 20 on base 30 only when shield 26 is in predetermined alignment with annular portion 38.

When one of detecting elements 22 and 24 is being subjected to ultraviolet radiation, a scratch on the surface thereof or extraneous matter, such as dirt or grease, adhering thereto, will produce extraneous fluorescence that produces an error in the indicated dosage. It is desirable, therefore, that an operator removing detecting means 20 from casing 28 touch neither detecting element 22 nor 24. In order to enable the operator to easily remove detecting means 20 from base 30 in the absence of cover 32, shield 26 and annular portion 38 are so constructed as to enable an operator to lift the shield by placing opposite fingers in contact with opposite edges thereof. In the illustrated embodiment, the overall diameter of shield 26 is greater than that of annular portion 38 for this purpose.

In the form shown, cover 32 is internally threaded at 48 and is provided with an annular portion 50 cut out as at 52 in order to receive therewithin a portion of detecting means 20. Annular portion 50 is adapted to abut against shield 26 in order to securely position detecting means 20 within the casing when base 30 is fastened to cover 32.

In the illustrated embodiment, in order to measure the dose of penetrative radiation to which elements 22 and 24 have been subjected, elements 22 and 24 may be excited by exposing remote faces 54 and 56 thereof to ultraviolet radiation and measuring the intensity of fluorescent light emanating from the edges thereof. In order to diminish errors resulting from the reflection of light within elements 22 and 24, the adjacent faces 58 and 60 thereof are separated from shield 26 by coatings 62 of black paint which absorb radiation falling thereupon. Indicia 64 may be placed on coatings 62 in order to give a visual indication of the proper orientation of detecting means 20.

In practice, the intensity of fluorescent light emitted from a surface of one of elements 22 and 24 during excitation will be dependent on the energy of the penetrative radiation to which the element has been subjected. The most harmful radiation effects of the explosion of an atomic bomb occur in the energy range of from .05 to 5.0 M. E. V. As a means for eliminating energy dependence within this range, a pair of lead shields 66 and 70, preferably of about 1 mm. in thickness, may be provided. As shown, shield 66 is affixed to base 30, normally adjacent face 56 of element 24. Shield 70 is affixed to cover 32 and is sufficiently large in area to cover face 54 of element 22 irrespective of the position which it assumes when base 30 and cover 32 are threaded together.

In operation, the assembled dosimeter may be predeterminedly secured to a wearer, for example to his breast pocket, with the free end of clip 42 pointing downwardly. When the dosimeter is in this position, detecting means 20 is predeterminedly oriented and ready for exposure. In order to measure the amount of penetrative radiation to which the wearer has been subjected, cover 32 may be unscrewed and detecting means 20 removed from engagement with annular portion 38 by placing opposite fingers in contact with opposite edges of shield 26. Faces 54 and 56 of elements 22 and 24 may now be excited with near ultraviolet radiation and the intensity of fluorescent light emanating from the various edges of elements 22 and 24 may be measured by any suitable photoelectric tube circuit. By comparing the various intensities, the direction and magnitude of radiation striking the wearer and the effective dose which he received may be calculated.

Referring now to Figs. 3 and 4, there is shown an alternative embodiment of a dosimeter which, in accordance with the present invention, comprises a detecting means, generally shown at 72, for measuring the effective dose of penetrative radiation to which the body a wearer thereof has been subjected. Detecting means 72, in the form shown, comprises a pair of photosensitive sheets 74 and 76, each of which comprises, for example, a silver halide layer having the property of becoming fogged when exposed to a dose of penetrative radiation, the degree of fogging being functionally related to the magnitude of the dose. As shown, sheets 74 and 76 are formed from a single blank in order to insure that they are uniform in sensitivity, the single blank being folded as at 78.

In the illustrated embodiment, sheets 74 and 76 are removably mounted in predetermined positions on opposite surfaces of a shield 80 which is composed of a material, such as that described above in connection with shield 26, that is adapted to effectively attenuate penetrative radiation passing therethrough. For properly orienting and positioning sheets 74 and 76 with respect thereto, shield 80 is provided with a notch 81 that is adapted to receive folded portion 78 of the blank from which sheets 74 and 76 are formed. Sheets 74 and 76 may be removably secured to shield 80 by such means as a pair of clasps 82, one of which is shown in Fig. 4. Sheets 74 and 76 may be secured to shield 80 in a dark room or may be provided with light-opaque layers that permit it to be secured to shield 80 in an illuminated environment.

As a means for mounting and enclosing detecting means 72, a casing 84, which includes a mounting means or base 86 and a closure or cover 88, is provided.

As shown, base 86 is substantially rectangular and includes a head portion 90 and a shank portion 92 integral therewith. Shank portion 92 is cut out, as at 94, to receive therewithin a portion of detecting means 72. Such means as a clip 96, secured to base 86, is provided for fastening base 86 to the chest of a wearer.

In the alternative embodiment, as in the embodiment illustrated in Figs. 1 and 2, means are provided for predeterminedly orienting detecting means 72 with respect to base 86. In the form shown, this means comprises three irregularly spaced pins 98 that are integral with or otherwise secured to shank portion 92 and that are adapted to project into three similarly spaced apertures 100 in shield 80. Pins 98 project into apertures 100, thereby properly seating detecting means 72 on shank portion 92 only when shield 80 is in predetermined alignment therewith. In order to enable the operator to easily remove detecting means 72 from engagement with shank portion 92, shield 80 and shank portion 92 are so constructed as to enable an operator to lift the shield from the shank portion by placing opposite fingers in contact with opposite edges thereof. In the illustrated embodiment, opposite peripheral areas of shank portion 92 are cut out for this purpose, as at 102.

In the form shown, cover 88, like base 86, is substantially rectangular and is provided with wall portions 104 which are adapted to receive shank portion 92. Means are provided for locking cover 88 to base 86 in lighttight fashion. In the form shown, the locking means comprises a plurality of beads 106 which, by reason of the resilience of wall portions 104, are adapted to snap into a plurality of grooves 108 formed in shank portion 92. Cover 88 is provided with a shank portion 110 that is cut out as at 112 to receive a portion of detecting means 72 and which is adapted to abut against shield 80 in order to secure it in properly seated position on shank portion 92.

It has been found that the effective dose received by the wearer's body, by reason of the shielding effect of one part on the other parts thereof, all other things being equal, when radiation strikes from overhead or underfoot, is considerably smaller than the effective dose received when the radiation strikes from the front or rear. Also, the effective dose received by the wearer's body, all other things being equal, when radiation strikes from the right or left, is smaller than the effective dose received when radiation strikes from the front or rear but larger than the effective dose received when radiation strikes from overhead or underfoot. In the alternative embodiment, means are provided which produce a shielding effect on detecting means 72 that is similar to the shielding effect of the human body on itself. In the form thereof as shown, the means comprises a plurality of shields 114 and 116 (Fig. 4) mounted on base 86 and cover 88 so as to be predeterminedly oriented with respect to sheets 74 and 76 when base 86, cover 88 and detecting means 72 are assembled. Viewing Fig. 4, shields 114 are relatively thick and are affixed to base 86 and cover 88 so as to shield sheets 74 and 76 from radiation received overhead or underfoot. Shields 116 are thinner than are shields 114 and are affixed to base 86 and cover 88 so as to shield sheets 74 and 76 from radiation received from the right or left.

In practice, the degree of fogging of sheets 74 and 76 will be dependent on the energy of penetrative radiation to which they have been subjected. As a means for eliminating such energy dependence, a pair of lead shields 118 and 120, smaller in thickness than either of shields 114 or 116, may be provided. As shown, shields 118 and 120 are affixed to base 86 and cover 88, respectively, and are normally adjacent sheets 76 and 74, respectively.

In the operation of the dosimeter of Figs. 3 and 4, sheets 74 and 76 are mounted on opposite sides of shield 80. Shield 80 then is aligned with base 86 by fitting pins 98 into apertures 100. Cover 88 now may be secured to base 86 and the assembled casing 84 may be secured to the lapel or pocket of a wearer with the free end of clip 96 pointed downwardly. When casing 84 is in this position, detecting means 72 is predeterminedly oriented with respect to the wearer and ready for exposure. After exposure of sheets 74 and 76, in order to measure the amount of penetrative radiation to which the wearer has been subjected, cover 88 may be pried from base 86, as by means of a screwdriver, and detecting means 72 may be removed from engagement with the shank portion 92 by placing opposite fingers in contact with opposite edges of shield 80. Sheets 74 and 76 may now be processed by a suitable photographic method and may be compared by any suitable means. One such means, by way of example, may comprise a graduated density scale of grays with which the degree of fogging of sheets 74 and 76 may be compared and an additional chart by which the difference in the degree of fogging of sheets 74 and 76 may be evaluated.

The herein disclosed invention may be embodied in dosimeters other than those above described in detail. For example, a single detecting element of sufficient size, composed of a material such as phosphate glass, one portion of which is adapted to shield other portions thereof, may be substituted for the two detecting elements and the interposed shield of one of the illustrated embodiments. Such a detecting element preferably is provided with indicia to enable predetermined orientation thereof with respect to a wearer. Alternatively, the detecting means may comprise more than two detecting elements, each being separated from the others by suitable shielding, the detecting means being provided with suitable means for enabling predetermined orientation thereof with respect to a wearer.

Since certain changes may be made in the above product without departing from the scope of the invention herein involved, it is intended that all matter contained in the above description or shown in the accompanying drawings shall be interpreted as illustrative and not in a limiting sense.

What is claimed is:

1. A dosimeter for determining the effective dose of penetrative radiation striking a body, said dosimeter comprising a first substantially planar detecting element having a pair of opposed faces, a second substantially planar detecting element having a pair of opposed faces, said detecting elements being similarly composed of a substance which undergoes a persisting change in predetermined properties when subjected to a quantity of penetrative radiation, said change being functionally related to said quantity, said detecting elements being in substantial parallelism, a substantially planar radiation-attenuating shield having a pair of opposed faces, said shield being disposed between said detecting elements with one of its faces in contiguity with one of the faces of said first detecting element and the other of its faces in contiguity with one of the faces of said second detecting element, a housing for said shield and said detecting elements, said housing being substantially transparent to said penetrative radiation, means for predeterminedly orienting said shield and said detecting elements with respect to said housing, and a fastener secured to said housing for predeterminedly orienting said housing with respect to said body.

2. A dosimeter for determining the effective dose of penetrative radiation striking a body, said dosimeter comprising a first substantially planar detecting element having a pair of opposed faces, a second substantially planar detecting element having a pair of opposed faces, said detecting elements being similarly composed of a substance which undergoes a persisting change in predetermined properties when subjected to a quantity of penetrative radiation, said change being functionally related to said quantity, said detecting elements being in substantial parallelism, a substanially planar shield havintg a pair of opposed faces, said shield being disposed beween said detecting elements with one of its faces in contiguity with one of the faces of said first detecting element and the other of its faces in contiguity with one of the faces of said second detecting element, said shield being composed of a material containing a metal having a density and an atomic number at least as great, respectively, as the density and atomic number of cadmium, said shield acting to reduce the effect of incident radiation on one of the detecting elements at a time, a housing for said shield and said detecting elements, said housing being substantially transparent to said penetrative radiation, means for predeterminedly orienting said shield and said detecting elements with respect to said housing, and a fastener for predeterminedly orienting said housing with respect to said body.

3. A dosimeter for determining the effective dose of penetrative radiation striking a body, said dosimeter comprising a first substantially planar detecting element having a pair of opposed faces, a second substantially planar detecting element having a pair of opposed faces, said detecting elements being similarly composed of a material which contains a substance selected from the group consisting of silver phosphate and silver halide, said detecting elements being adapted to undergo a persisting change in predetermined properties when subjected to a quantity of penetrative radiation, said change being functionally related to said quantity, said detecting elements being in substantial parallelism, a single substantially planar shield disposed between said detecting elements, said shield having a pair of opposed faces one of which is in contiguity with one of the faces of said first detecting element and the other of which is in contiguity with one of the faces of said second detecting element, said shield being uniformly composed of a heavy material comprising a metal having a density and an atomic number at least as great, respectively, as the density and atomic number of cadmium, said shield being of sufficient thickness to reduce the effect of incident radiation on one of the detecting elements at a time, a housing for said shield and said detecting elements, said housing being substantially transparent to said penetrative radiation, means for predeterminedly orienting said shield and said detecting elements with respect to said housing, and a fastener secured to said housing for predeterminedly orienting said housing with respect to said body.

4. A dosimeter for determining the effective dose of penetrative radiation striking a body, said dosimeter comprising a base, a cover capable of being secured to said base to form therewith a casing, a first substantially planar detecting element having a pair of opposed faces, a second substantially planar detecting element having a pair of opposed faces, said detecting elements being similarly composed of a substance which undergoes a persisting change in predetermined properties when subjected to a quantity of penetrative radiation, said change being functionally related to said quantity, said detecting elements being in substantial parallelism, a substantially planar shield having a pair of opposed faces, said shield being disposed between said detecting elements with one of its faces secured to one of the faces of said first detecting element and the other of its faces secured to one of the faces of said second detecting element, said shield being composed of a heavy metal having a density and an atomic number at least as great, respectively, as the density and atomic number of cadmium, said shield within said casing being detachably mounted on and predeterminedly oriented relative to said base, and a fastener secured to said base for predeterminedly orienting said detecting elements with respect to said body.

5. A dosimeter for determining the effective dose of penetrative radiation striking a body, said dosimeter comprising a base, a cover detachably mounted on said base to form therewith a casing, an assemblage including a first detecting element having a pair of opposed faces, a single radiation-attenuating shield having a pair of opposed faces and a second detecting element having a pair of opposed faces, said detecting elements being similarly composed of a substance which undergoes a persisting change in predetermined properties when subjected to a quantity of penetrative radiation, said change being functionally related to said quantity, said shield being uniformly composed of a material containing a heavy metal having a density and an atomic number at least as great, respectively, as the density and atomic number of cadmium, said detecting elements being in substantial parallelism, said shield being disposed between said detecting elements with one of its faces secured to one of the faces of said first detecting element and the other of its faces secured to one of the faces of said second detecting element, means for detachably mounting said assemblage on said base within said casing, means for predeterminedly orienting said assemblage relative to said base, and a fastener secured to said base for predeterminedly orienting said assemblage with respect to said body.

6. The dosimeter of claim 5 in which said substance contains a material selected from the group consisting of silver phosphate and silver halide.

7. A dosimeter for determining the effective dose of penetrative radiation striking a body, said dosimeter comprising a base, a cover detachably mounted on said base to form therewith a casing, an assemblage including a first detecting element having a pair of opposed faces, a single radiation-attenuating shield having a pair of opposed faces and a second detecting element having a pair of opposed faces, said detecting elements being similarly composed of a substance which undergoes a persisting change in predetermined properties when subjected to a quantity of penetrative radiation, said change being functionally related to said quantity, said shield being uniformly composed of a material containing a heavy metal having a density and an atomic number at least as great, respectively, as the density and atomic number of cadmium, said detecting elements being in substantial parallelism, said shield being disposed between said detecting elements with one of its faces secured to a face of said first detecting element and the other of its faces secured to a face of said second detecting element, one of said shield and said base being provided with a series of lugs, the other of said shield and said base being provided with a series of notches, said lugs and notches cooperating to predeterminedly orient said assemblage relative to said base, a portion of said cover being adapted to clamp said shield against a portion of said base, and a fastener secured to said base for predeterminedly orienting said assemblage with respect to said body.

8. A dosimeter for determining the effective dose of penetrative radiation striking a body, said dosimeter comprising at least a pair of detecting elements, each of said elements being composed of silver phosphate glass which substantially changes in predetermined properties when subjected to a quantity of penetrative radiation, the change in said predetermined properties being functionally related to said quantity, and a shield separating said elements, said shield being composed of a heavy metal having a density and an atomic number at least as great, respectively, as the density and atomic number of cadmium.

9. A dosimeter for determining the effective dose of penetrative radiation striking a body, said dosimeter comprising at least one detecting element that is composed of a substance which substantially changes in predetermined properties when subjected to a quantity of radiation, the change in said predetermined properties being functionally related to said quantity, one portion thereof being adapted to substantially shield another portion thereof from penetrative radiation so that when said one portion is closer to the source of penetrative radiation than said other portion, said one portion changes in predetermined properties to a greater degree than does said other portion, a penetrative-radiation-transparent casing for said detecting element, indicia on said detecting element for orienting said detecting element within sad casng, and means secured to said casing for fastening said casing to said body.

10. A dosimeter for determining the effective dose of penetrative radiation striking a body, said dosimeter comprising at least one detecting element that is composed of silver phosphate glass which substantially changes in predetermined properties when subjected to a quantity of radiation, the change in said predetermined properties being functionally related to said quantity, one portion thereof being adapted to substantially shield another portion thereof from penetrative radiation so that when said one portion is closer to the source of penetrative radiation than said other portion, said one portion changes in predetermined properties to a greater degree than does said other portion, a penetrative-radiation-transparent casing for said detecting element, indicia on said detecting element for orienting said detecting element within said casing, and means secured to said casing for fastening said casing to said body.

11. A dosimeter for determining the effective dose of penetrative radiation striking a body, said dosimeter comprising a base, a cover capable of being secured to said base to form therewith a casing, a pair of detecting elements each including a silver halide layer which is fogged appreciably when subjected to a quantity of penetrative radiation, the degree of fogging being functionally related to said quantity, said base defining a cavity for a predetermined one of said detecting elements, said cover providing a cavity for the other of said detecting elements, a shield, at least a portion of said shield comprising a heavy metal having a density and an atomic number at least as great, respectively, as the density and atomic number of cadmium, said detecting elements being secured to opposite sides of said shield, means for seating said shield in a predetermined position with respect to said base, means on said cover for securing said shield in said predetermined position when said cover is secured to said base, said one detecting element being positioned in said cavity defined by said base and said other detecting element being positioned in said cavity defined by said cover when said shield is in said predetermined postion and said cover is secured to said base, and means secured to said casing for fastening said casing to said body.

12. A dosimeter for determining the effective dose of penetrative radiation striking a body, said dosimeter comprising a casing, at least two detecting elements within said casing, each composed of a substance which appreciably changes in predetermined properties when subjected to a quantity of penetrative radiation, the change in said predetermined properties being functionally related to said quantity, each of said detecting elements having opposed face portions, a shield predeterminedly oriented within said casing between said two detecting elements, face portions of said two elements being adjacent opposite surfaces of said shield, each of said detecting elements having a plurality of edge portions, at least a shield of a predetermined thickness positioned adjacent at least one of said edge portions, and at least a shield of a thickness other than said predetermined thickness positioned adjacent at least another of said edge portions, said shields being composed of a material containing atoms of relatively high atomic number, said shields producing a shielding effect on said detecting elements that is similar to the shielding effect of said body on itself.

13. A dosimeter for determining the effective dose of penetrative radiation striking a body, said dosimeter comprising a casing, at least two detecting elements within said casing, each composed of a substance which appreciably changes in predetermined properties when subjected to a quantity of penetrative radiation, the change in said predetermined properties being functionally related to said quantity, each of said detecting elements having opposed face portions, a shield predeterminedly oriented within said casing between said two detecting elements, face portions of said two elements being adjacent opposite surfaces of said shield, each of said detecting elements having a first pair of opposed edge portions and a second pair of opposed edge portions, shields for producing a predetermined attenuating effect in penetrative radiation passing therethrough, said shields being positioned adjacent said first pair of edge portions, shields for producing a different attenuating effect than said predetermined attenuating effect, said last-mentioned shields being positioned adjacent said second pair of edge portions, said shields comprising a heavy metal having a density and an atomic number at least as great, respectively, as the density and atomic number of cadmium, said shields producing a shielding effect on said detecting elements that is similar to the shielding effect of said body on itself.

14. A dosimeter for determining the effective dose of penetrative radiation striking a body, said dosimeter comprising a base, a cover capable of being secured to said base to form therewith a casing, a pair of detecting elements each including a material which is fogged appreciably when subjected to a quantity of penetrative radiation, the degree of fogging being functionally related to said quantity, said base providing a cavity for one of said detecting elements, said cover providing a cavity for the other of said detecting elements, a shield, at least a portion of said shield comprising a heavy metal having a density and an atomic number at least as great, respectively, as the density and atomic number of cadmium, said detecting elements being secured to opposite sides of said shield, means for seating said shield in a predetermined position with respect to said base, means on said cover for securing said shield in said predetermined position when said cover is secured to said shield, said one detecting element being positioned in said cavity provided by said base and said other detecting element being positioned in said cavity provided by said cover when said shield is in said predetermined position and said cover is secured to said base, and means secured to said casing for fastening said casing to said body.

References Cited in the file of this patent

UNITED STATES PATENTS

| | | |
|---|---|---|
| 2,459,528 | Hook | Jan. 18, 1949 |
| 2,496,218 | Kieffer | Jan. 31, 1950 |
| 2,578,703 | Hopkins et al. | Dec. 18, 1951 |